United States Patent
Blair et al.

[15] 3,656,224
[45] Apr. 18, 1972

[54] METHOD OF FORMING A HONEYCOMB CORE PANEL

[72] Inventors: Winford Blair, La Mesa; Walter L. Bubel, Chula Vista, both of Calif.

[73] Assignee: Rohr Corporation, Chula Vista, Calif.

[22] Filed: Apr. 9, 1969

[21] Appl. No.: 814,603

[52] U.S. Cl. ..................................29/471.1, 29/495
[51] Int. Cl. ...........................................B23k 31/02
[58] Field of Search .........................29/471.1, 495

[56] References Cited

UNITED STATES PATENTS

| | | | |
|---|---|---|---|
| 3,001,277 | 9/1961 | Giovannucci | 29/495 |
| 3,011,254 | 12/1961 | Melill | 29/471.1 |
| 3,030,703 | 4/1962 | Wirsing | 29/471.1 |
| 3,067,507 | 12/1962 | Titus | 29/471.1 |
| 3,071,853 | 1/1963 | Price | 29/471.1 |
| 3,091,845 | 6/1963 | Herman | 29/471.1 |
| 3,122,117 | 2/1964 | Marzullo | 29/495 |
| 3,123,908 | 3/1964 | Boller | 29/495 |
| 3,140,538 | 7/1964 | Rutledge | 29/495 |
| 3,365,787 | 1/1968 | Forsberg | 29/471.1 |
| 3,456,331 | 7/1969 | Holden | 29/495 |

*Primary Examiner*—John F. Campbell
*Assistant Examiner*—Donald P. Rooney
*Attorney*—George E. Pearson

[57] ABSTRACT

Face sheets are bonded to honeycomb core material by applying brazing material to a side surface of one of said face sheets, placing one side of the honeycomb core material against the side of the aforesaid face sheet covered with brazing material and the other face sheet against the other side of the honeycomb core material, heating the assembly to melt the brazing material, and thereafter permitting the assembly to cool. Capillary action causes flow of the brazing material from the face sheet initially covered therewith to the other face sheet when the brazing material is melted.

5 Claims, 5 Drawing Figures

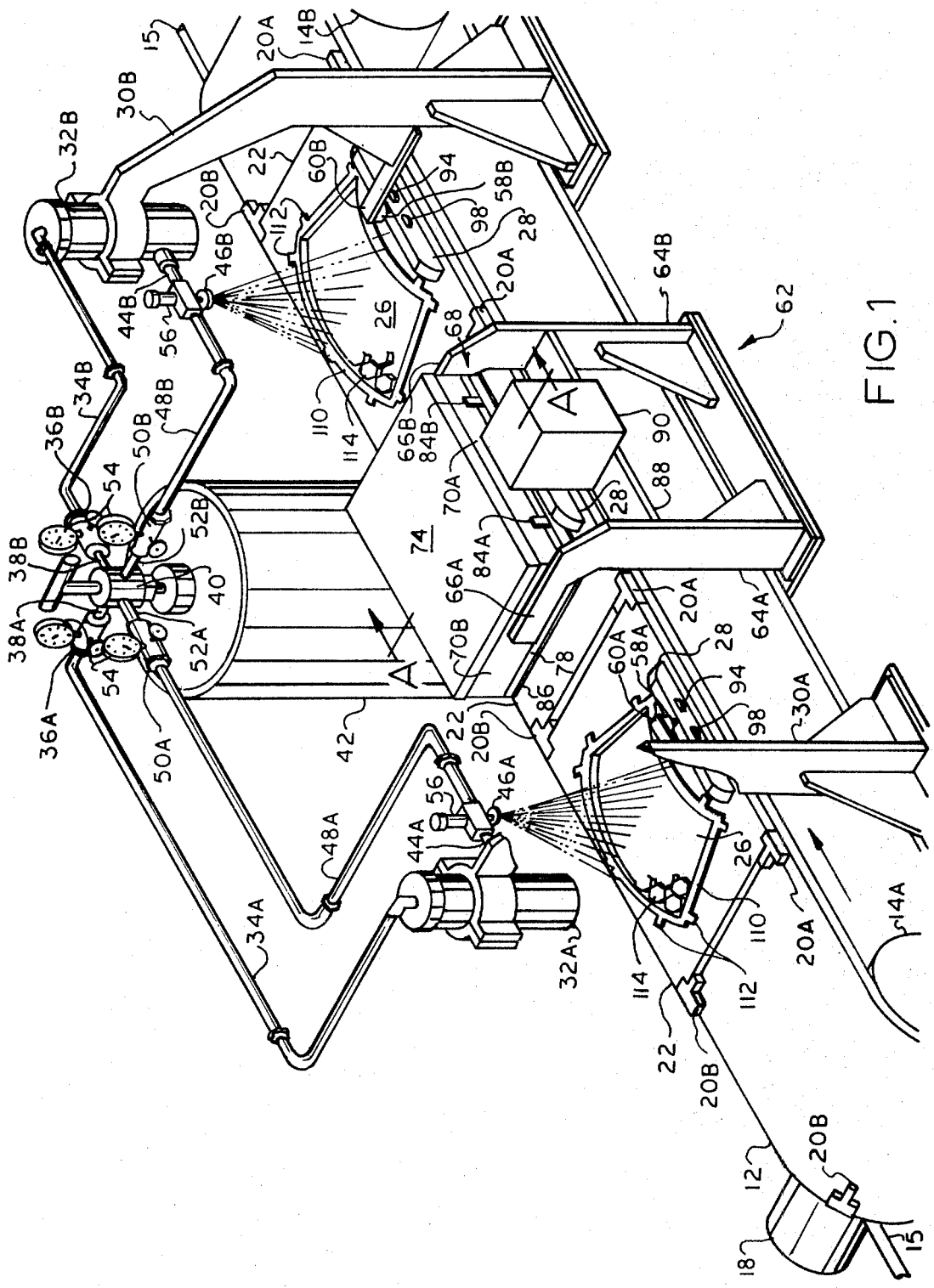

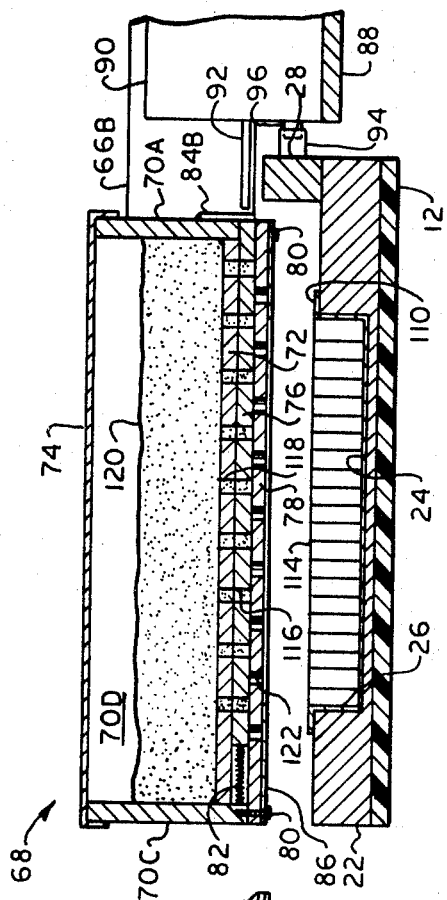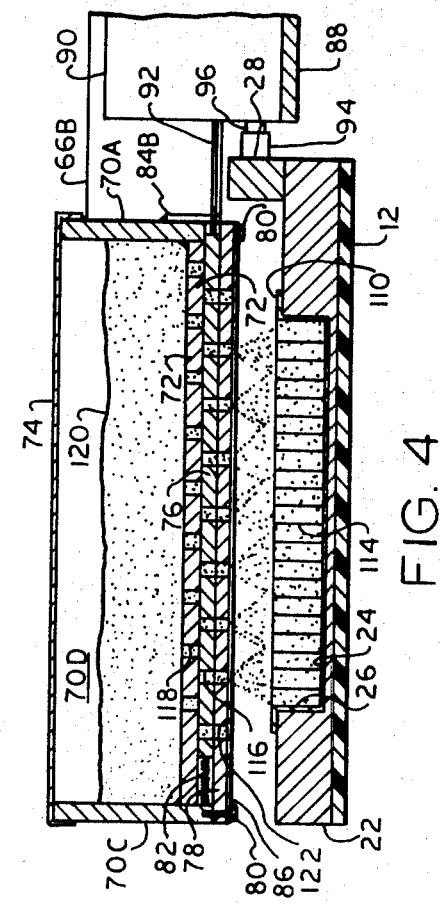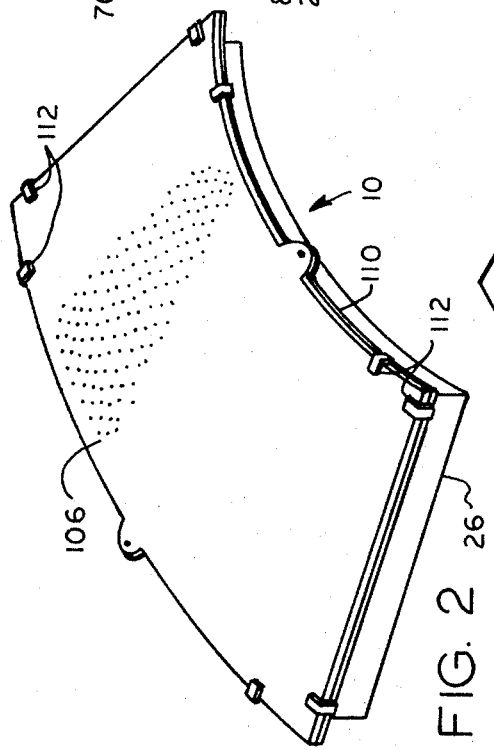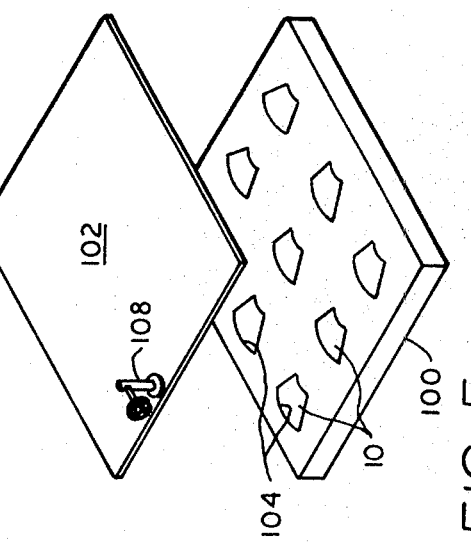
INVENTOR.
WINFORD BLAIR
BY WALTER L. BUBEL
Edwin D. Grant
ATTORNEY

METHOD OF FORMING A HONEYCOMB CORE PANEL

BACKGROUND OF THE INVENTION

This invention relates to honeycomb core panels and method and apparatus for forming the same. More particularly, in accordance with this invention bonds between face sheets and honeycomb core material are formed by melting bonding material disposed on one of said face sheets.

Heretofore honeycomb core panels have been fabricated by placing a sheet of a brazing alloy between a honeycomb core and each of two face sheets between which said core is sandwiched, heating the assembly to melt the brazing alloy and cause it to flow between adjacently disposed surfaces of the face sheets and honeycomb core material, and thereafter allowing the assembly to cool, whereupon the brazing alloy solidifies and bonds the aforesaid surfaces to one another.

In some instances it is desirable to form a honeycomb core panel with a perforate face sheet. The conventional fabrication technique which utilizes two sheets of brazing alloy has been found unsatisfactory for forming honeycomb core panels of this type because the holes in the perforate face sheet are clogged with brazing alloy when the material is melted and then solidified. The present invention not only eliminates this clogging problem but also provides heat bonded honeycomb panels of good quality and economical apparatus and method for fabricating the same.

SUMMARY OF THE INVENTION

In accordance with a preferred fabrication method of this invention one side of a face sheet of a honeycomb core panel is coated with a liquid binder by means of a spray nozzle, and powdered brazing material is deposited on the binder coated side by means of a dispenser adapted to release a predetermined amount of said brazing material on said side when the face sheet is disposed thereunder. Preferably the same side is again sprayed with liquid binder to stabilize the layer of brazing material placed thereon. Next a sheet of honeycomb core material is placed upon the powder covered side of the aforesaid face sheet and a second face sheet is placed upon this honeycomb core material to complete the panel sandwich. The panel sandwich is then placed in a recess formed in a support block, with the powder covered face sheet supported on the bottom of said recess and the outer surface of the other face sheet even with the upper surface of the support block. A caul sheet is laid over the honeycomb core panel and the support block, and its edges are welded to the upper surface of the latter to thereby form an enclosure in which said panel is hermetically sealed. Sealably mounted in an aperture in the caul sheet is a vent valve. Air is evacuated through this vent valve from the space between the support block and caul sheet, and then the support block is placed in an oven wherein a temperature capable of melting the aforesaid brazing material is maintained. After it is melted, some of the brazing material is drawn by capillary action across the wall surfaces of the honeycomb core material to the face sheet not initially covered therewith. When sufficient time has been allowed for this transfer of brazing material to occur, the support block is removed from the oven and cooled by exposure to ambient air. The brazing material is thus solidified and bonds the facing sheets to the honeycomb core material.

OBJECTS OF THE INVENTION

It is accordingly an object of this invention to provide an improved honeycomb core panel.

Another object of the invention is to provide an effective method of bonding a perforate face sheet to honeycomb core material by means of brazing alloy.

An additional object of the invention is to provide simple and economical apparatus for carrying out the method of bonding facing sheets to honeycomb core material by means of powdered bonding material.

Still another object of the invention is to provide a method and apparatus for fabricating a honeycomb core panel which has a perforate face sheet, which method and apparatus do not close the holes in said perforate face sheet with brazing material.

DESCRIPTION OF THE DRAWINGS

FIG. 1 is a pictorial view of apparatus employed in carrying out certain steps of the preferred method of fabricating honeycomb core panels in accordance with this invention, the drawing illustrating two partially assembled panels as they are being sprayed with liquid binder by means of two spray nozzles;

FIG. 2 is a pictorial view illustrating one of the panel assemblies of FIG. 1 as it appears after a second perforate face sheet has been added thereto;

FIGS. 3 and 4 are cross-sectional views of certain components of the apparatus of FIG. 1, taken along the plane represented by line A—A in FIG. 1 and in the direction indicated by arrows in the latter drawing, a pallet on which one of the aforementioned panel assemblies is supported being illustrated as it appears when carried by a conveyer belt to two different positions under a powder dispenser included in the apparatus, and components associated with said powder dispenser being illustrated in different positions in the two drawings; and FIG. 5 is a pictorial view of other apparatus employed in carrying out certain steps of the preferred method of fabricating honeycomb core panels in accordance with the invention.

Throughout the drawings and the following specification, like numbers designate like parts.

DETAILED DESCRIPTION

FIG. 1 illustrates apparatus which in accordance with this invention can advantageously be employed to carry out certain steps in the fabrication of the honeycomb core panel which is illustrated in FIG. 2 and generally designated in the last mentioned drawing by the number 10. Panel 10 will be described in further detail hereinafter. The aforesaid apparatus comprises a conveyer belt 12 supported upon two rollers 14A, 14B, the latter being rotatably mounted between bars 15 which are fixedly secured to support structures (not shown). Roller 14A is connected by a drive shaft to an electric motor 18 provided with suitable speed reduction gears. Fixedly mounted along the edges of belt 10 and evenly spaced apart longitudinally thereof are a plurality of T-shaped blocks 20A, 20B. The blocks 20A located at one edge of belt 10 are transversely aligned with blocks 20B located at the other edge of the belt, and the spacing between the aligned pairs of blocks is such that pallets 22 can be placed on the upper surface of the belt with the notched corners thereof in contact with adjacent pairs of blocks. As illustrated in FIGS. 3 and 4, each pallet 22 has in its upper surface a recess 24 which is adapted to receive the lower portion of a first pan-shaped face sheet 26 constituting one component of the aforesaid panel 10. An elongate block 28 is fixedly attached to the upper surface of each pallet 22 and is disposed adjacent one edge of the pallet in parallel relation therewith. The upper surface of each block 28 comprises rounded end portions and a planar middle portion which is parallel with the upper surface of the pallet to which the block is attached. Fixedly positioned adjacent each roller 14A, 14B is a vertically extending support 30A, 30B (support 30A being broken away in FIG. 1 for clarity) which has a container 32A, 32B mounted on the upper end thereof. One end of a conduit 34A, 34B is disposed in an aperture in the top of each container 32A, 32B and the other end thereof is connected to a pressure regulator 36A, 36B which in turn is connected by means of a short conduit 38A, 38B to a valve 40 mounted on a tank 42 containing air under pressure. One end of another conduit 44A, 44B is disposed in an aperture located at the lower portion of each container 32A, 32B and the other end thereof communicates with the orifice of a spray nozzle 46A, 46B. A conduit 48A, 48B also connects each spray nozzle to a pressure regulator 50A, 50B which in turn is connected by a short conduit 52A, 52B to valve 40. Each of the aforesaid pressure regulators is provided with a pressure gauge 54, and an actuator 56 is associated with each spray nozzle 46A, 46B and adapted to be operated by a contact member 58A, 58B mounted on an arm 60A, 60B which extends from a respective one of the supports 30A, 30B. As will be explained in detail hereinafter, the arrangement of blocks 28, spray nozzles 46, and contact members 58 is such that liquid contained in containers 32 is sprayed upon the upper surfaces of face sheets 26 supported on pallets 22 as the latter are moved under said spray nozzles.

A third support, generally designated in FIG. 1 by the number 62 and comprising a pair of vertically extending members 64A, 64B and a pair of parallel arms 66A, 66B which respectively project horizontally from the upper ends of the latter, is fixedly positioned adjacent belt 12 and between supports 30A, 30B. Mounted between arms 66A, 66B is a container which is generally designated by the number 68 in FIGS. 1, 3 and 4 and which comprises four sides 70A–70D, a perforate, horizontally disposed bottom 72, and a removable cover 74. Side 70A is coterminous with the lower edge of bottom 72 whereas the other three sides 70B, 70C, 70D extend a short distance below said bottom. First and second perforate, horizontally extending plates 76, 78 are disposed under bottom 72, said second plate 78 being fixedly secured to the lower edges of sides 70B, 70C, 70D by means of machine screws 80 and said first plate 76 being slidably disposed between said bottom and first plate. MOre explicitly, the side edges of first plate 76 slidably abut the inner surfaces of sides 70B and 70D, and the rear edge (i.e., the edge remote from support 62) of said first plate is spaced from side 70C. One end of a spring 82 is connected to the rear edge of first plate 76 and the other end thereof is connected to the inner surfaces of side 70C, thereby resiliently urging said first plate toward support 62. Movement of first plate 76 toward said support 62 is limited, however, by two stops 84A, 84B which are fixedly attached to the outer surface of side 70A and which project downwardly from the lower edge thereof. Screws 80 also hold the upper surface of an apertured masking frame 86 against the peripheral portion of the lower surface of second plate 78. For a reason which will become apparent hereinafter, the aperture in masking frame 86 has the same shape as the perimeter of panel 10.

As illustrated in FIG. 1, a plate 88 extends between members 64A, 64B of support 62, and an actuator 90 is fixedly mounted on the upper surface of this plate. Illustrated in FIGS. 3 and 4 is a plunger 92 carried by actuator 90 and movable thereby along its own longitudinal axis, which axis is disposed perpendicular to side 70A of container 68 and located at such distance from the lower edge of said side that the plunger contacts the front edge of first plate 76 when it is extended from actuator 90. As will be further considered hereinafter, actuator 90 is arranged to extend plunger 92 to the position illustrated in FIG. 4 when a first lug 94 which projects from the outer side of each block 28 strikes a contact member 96 on said actuator as the pallet associated with said block is moved under container 68, and the actuator is further arranged to return plunger 92 to the position illustrated in FIG. 3 when a second lug 98 which also projects from the outer side of said block strikes said contact member.

FIG. 5 illustrates a support block 100 and a caul sheet 102 which are employed in carrying out steps in the fabrication of panels 10 which follow the process steps associated with the apparatus illustrated in FIG. 1. The upper surface of support block 100 has nine recesses 104 formed therein, each of which is shaped so that a panel 10 can be seated therein with the upper surface of a second perforate face sheet 106 (see FIG. 2) of the panel even with the adjacent upper surface of said support block. It will be mentioned at this point that both face sheets 26, 106 are formed of Inconel 625. Caul sheet 102 is sized so that it can be placed upon the upper surface of support block 100 with its edges spaced from the edges of the support block. The caul sheet has an aperture (not shown) therein, and one end of a vent valve 108 is sealably engaged within this aperture. After panels 10 have been seated in the recesses 104 of support block 100, the edges of caul sheet 102 are welded to said support block and the assembly thus formed is subsequently placed in a conventional oven where a step of the fabrication method which is described hereinafter is carried out. Since ovens of many different types may be employed for the purposes of this invention, it is not considered necessary to illustrate or described a particular oven.

OPERATION

It should be pointed out that panels 10 are utilized as blocker doors in the thrust reversal apparatus of a jet propulsion power plant. However, the invention must not be considered as being limited to the fabrication of honeycomb core panels of a particular type or shape, or to such panels formed of particular materials.

As noted hereinbefore, each panel 10 comprises first and second face sheets 26 and 106. More explicitly, face sheet 26 is a sheet metal stamping which has the general form of a shallow pan two opposite sides of which are curved and the other two sides of which are substantially planar and obliquely disposed relative to each other. A flange 110 (see FIGS. 1, 3 and 4) extends around the edge of the four sides of face sheet 26 and is disposed perpendicular thereto. Furthermore, two tabs 112 extend from each side edge of said flange 110. Before face sheets 26 are positioned in the recesses 24 of pallets 22, a metallic honeycomb core 114, also formed of Inconel 625, is placed in the cavity of each face sheet, and edges of this core are spot welded to the sides of the face sheet by means of conventional, manually operated equipment (for the sake of simplifying the drawings, only portions of the honeycomb cores are illustrated in FIG. 1). It will be understood that the length of conveyor belt 12 is not limited to that illustrated in FIG. 1, and that the use of a longer belt would permit more than three pallets 22 to be simultaneously supported thereon. After a pallet carrying a face sheet 26 and associated honeycomb core 114 has been positioned on belt 12 between blocks 20, motor 18 is operated to move the pallet under spray nozzle 46A. When block 28 of the pallet engages the contact member 58 carried by arm 60A, actuator 56 of spray nozzle 46A is operated and liquid from container 32A is sprayed upon the upper surface of the portion of face sheet 26 which forms the bottom of the panel assembly (said liquid passing through the open cells of the honeycomb core 114) and also upon the upper surface of flange 110. The length and location of block 28 on pallet 22 are such that spraying commences when the edge of a face sheet 26 which is on the right in FIG. 1 reaches a point directly under spray nozzle 46A, and spraying ceases when the edge of said face sheet which is on the left in the same drawing passes beyond the same point. Obviously some liquid will also be deposited on honeycomb core 114, but for convenience reference will hereafter be made to the liquid sprayed on face sheet 26 only and it is to be understood that such reference includes that portion of the liquid which is deposited on said honeycomb core.

The liquid which is sprayed upon the upper surface of face sheet 26 preferably is that sold by Wall Colmonoy Corporation, Detroit, Mich., under their product name "Nicrobraz Cement No. 600."However, other liquids which will cause a powdered material to adhere to the surface of face sheet 26 may also be employed, such as various lacquers. The amount of Nicrobraz Cement No. 600 sprayed on the inner surface of face sheet 26 by spray nozzle 46A is one-tenth of a pint per square foot. Best spraying results have been obtained by use of a syphon type spray nozzle positioned not more than 12 inches above a face sheet 26, with air pressure applied to the Nicrobraz Cement No. 600 in containers 32 being set at 3 psi and air pressure in conduits 48 being set at 10 psi. Pallets 22 are moved under spray nozzles 46 at a rate of about 3.5 inches per second.

As belt 12 continues to move face sheet 26 in the direction indicated by the arrow in FIG. 1, the face sheet is carried under container 68 and lug 94 on block 28 strikes contact member 96 of actuator 90 and thereby causes plunger 92 to move from the position thereof which is illustrated in FIG. 3 to the position thereof which is illustrated in FIG. 4. Until plunger 92 is moved as aforesaid, first plate 76 is in a first position thereof wherein holes 116 therein are respectively in register with holes 118 in bottom 72 of container 68. Hence when first plate 76 is in said first position powdered bonding material 120 which is held in container 68 can flow through holes 118 in bottom 72 and into holes 116 in first plate 72. However, when plunger 92 is moved to the position thereof which is illustrated in FIG. 4, first plate 72 is moved to the second position thereof which is illustrated in the same drawing, in which position of the first plate the holes therein are respectively in register with holes 122 in second plate 78. The powdered bonding material in holes 116 in first plate 76 can then flow through holes 122 in second plate 78 and onto the liquid coated surfaces of face sheet 26.

The powdered bonding material held in container 68 and released upon face sheet 26 as aforesaid is preferably the powdered brazing alloy sold by Alloy Metals, Inc., Troy, Mich., under their produce name "Amdry 930."However many other powdered brazing materials have been found effective for use in the fabrication of metallic honeycomb core panels in accordance with the invention disclosed herein. Moreover, when the disclosed fabrication method is employed in the manufacture of non-metallic honeycomb core panels the powdered material held in container 68 will of course not be a brazing material, the only requirement of a powdered bonding material useful in said method being that it is capable of flow by capillarity when melted, which, as will be further considered hereinafter, enables bonding material to be transferred from one face sheet across the walls of a honeycomb core to a second face sheet. It is also possible to use a single sheet of a bonding material to bond two face sheets of a honeycomb core panel in accordance with this invention, provided the bonding material of which said sheet is formed is capable of flowing across the cell walls of a honeycomb core by capillarity after it has been melted. Further details concerning the deposition of powdered brazing material on face sheet 26 will be presented after a description of the process step which involves melting said brazing material.

To ensure that liquid binder wets the uppermost portion of the powdered material which is placed upon face sheet 26 by means of container 68 and the apparatus associated therewith (which wetting is necessary to retain said powdered material on the panel until it is melted in the aforementioned process step), face sheet 26 is next moved by belt 12 under spray nozzle 46B, whereupon liquid binder from container 32B is sprayed on the powdered covered surface of the face sheet. The liquid binder held in container 32B and sprayed on face sheet 26 by spray nozzle 46B is the same as that initially sprayed on said face sheet, and the manner of operation of spray nozzle 46B is also the same as that of spray nozzle 46A. Therefore it is not considered necessary to further describe the second spraying step effected by spray nozzle 46B and equipment associated therewith. However, it should be noted that the amount of liquid binder sprayed on face sheet 26 by spray nozzle 46B is also one-tenth of a pint per square foot, thus bringing the total amount of liquid binder sprayed on said face sheet 26 to one-fifth of a pint per square foot. As will be further considered hereinafter, the amount of both liquid binder and powdered bonding material applied to the inner surface of a face sheet of a honeycomb core panel formed in accordance with the invention will vary, and quantities which have been mentioned are exemplary only.

After liquid binder and powdered brazing alloy have been placed on face sheet 26 and honeycomb core 114 by the foregoing process steps, the layer of said materials thus deposited on the assembly is allowed to dry in ambient air for approximately 5 minutes. The second face sheet 106 is then placed against the upper surface of flange 110 of face sheet 26 and the upper edges of honeycomb core 114, and the edges of the face sheets are aligned as illustrated in FIG. 2. Tabs 112 on said flange 110 are next bent over the edges of face sheet 106, as is also illustrated in the last mentioned drawing.

After nine panels 10 have been assembled as aforesaid, they are placed in the recesses of support block 100 and caul sheet 102 is placed upon the panels and support block. The edges of the caul sheet 102 are then welded to the upper surface of the support block. Air is next pumped from the space between support block 100 and caul sheet 102 by attaching one end of a conduit to vent valve 108 and the other end of this conduit to a vacuum pump. Such evacuation equipment is conventional and consequently it is not illustrated in the drawings. It will be apparent that after air is evacuated from the space between caul sheet 102 and support block 100, atmospheric pressure will force the caul sheet against the face sheets 106 of panels 10 and will thereby hold said face sheets 106 and face sheets 26 against opposite edges of the cell walls of the honeycomb cores sandwiched therebetween.

The support block 100 and the panels 10 thereon are next placed in an oven and subjected to a temperature of 1,910 ± 25° F. for 3 – 15 minutes. During this process step the powdered brazing alloy on the upper surface of the bottom potion of each pin-shaped face sheet 26 and on the upper surface of flange 110 is melted, and a portion of the melted alloy flows between the interfaces of said sheet 26 and honeycomb core 114 seated in the cavity of said face sheet 26. Some of the melted brazing alloy is also drawn by capillarity up the cell walls of the honeycomb core 114 to the upper edges thereof and into the interfaces between the lower surface of face sheet 106 and said honeycomb core. After support block 100 and the panels thereon are removed from the oven and allowed to cool, the brazing alloy solidifies and thus forms bonds between the face sheets 26, 106 and honeycomb core 114, as well as a bond between the flange 110 of said face sheet 26 and the adjacent edge portion of face sheet 106.

The above-described processes steps are particularly advantageous for the fabrication of honeycomb core panels such as panel 10 wherein one face sheet 106 is perforate, since as mentioned hereinbefore it is not possible to employ conventional brazing methods in the fabrication of such a panel without clogging the holes in said face sheet 106 with brazing material. However, it has been found that the steps of spraying liquid binder on a surface of a face sheet and then depositing powdered brazing material on the surface thus coated also provide an effective and economical method of bonding honeycomb core material to face sheets which are perforate. It has also been found that bonds of good quality are obtained by either placing honeycomb core material against the surface of a face sheet to which said material is to be bonded before liquid binder and powdered bonding material are deposited thereon, or by placing the honeycomb core material on the surface of the face sheet after liquid binder and powdered bonding material are deposited thereon. The quantities of liquid binder and powdered bonding material which must be employed will depend upon the particular type of panel which is to be fabricated. Obviously less bonding material will be required where one face sheet is bonded to a honeycomb core than will be required where two face sheets are bonded to a honeycomb core and the bonding material is drawn by capillarity from one face sheet to the other as described. Hence the size and spacing of holes 118, 116, 122 in bottom 72 and first and second plates 76 and 78, respectively, will vary according to the amount of powder which must be dispensed therethrough. In the preferred fabrication process of the invention which has been presented herein the holes 118, 116, 122 are spaced 0.250 inch from each other and each hole has a diameter of 0.060 inch. Furthermore, in the exemplary process the quantity of brazing alloy deposited on face sheet 26 is 40 grams per square foot of surface, and the thickness of honeycomb core 114 is about 0.3 inch. The purpose of masking frame 86 is to limit the flow of bonding material from container 68 to the area of a panel 10 which must be covered with said material. Hence it is contemplated that a plurality of masking frames 86, having therein apertures which conform with the perimetric shape of different types of panels, will be utilized with the disclosed apparatus.

Although this invention has been described with reference to a particular embodiment of the same, it should not be considered to be limited thereto for various modifications could be made therein by one having ordinary skill in the art without departing from the spirit and scope of the invention as defined in the following claims.

What is claimed as new and useful and desired to be secured by Letters Patent is:

1. The method of forming a honeycomb core panel which comprises:
   placing bonding material on one side only of a first face sheet;
   placing one end of a honeycomb core against said bonding material;
   placing a second face sheet against the other end of said core, the entire second face sheet being free of bonding material;
   melting said bonding material to thereby cause it to flow by capillarity across the cell walls of said core to bond said second face sheet to the core, and
   holding said second face sheet against said other end of the core while said bonding material is melted and then permitted to solidify.

2. The method defined in claim 1 wherein said honeycomb core material is placed against said one side before said binder and bonding material are placed thereon.

3. The method defined in claim 1 wherein said honeycomb core material is placed against said one side after said binder and bonding material are placed thereon.

4. The method defined in claim 1 wherein said face sheet and honeycomb core material are metallic and said bonding material is a brazing material.

5. The method of forming a honeycomb core panel which comprises:
   pacing one end of honeycomb material against the inner surface of a first face sheet;
   spraying liquid binder on the inner surface of said first face sheet while moving the latter past a spray nozzle at a predetermined velocity;
   placing powdered brazing material on the binder on said inner surface of the first face sheet;
   spraying liquid binder on said brazing material after the latter has been placed on the inner surface of said first face sheet;
   placing a second face sheet against the other end of said honeycomb core material; and
   holding said first and second face sheets against the ends of said honeycomb core material while melting said brazing material and holding it in molten condition for a sufficient period of time to flow by capillarity across the cell walls of the honeycomb core material and between contiguous surfaces of the other end of the honeycomb core material and a second face sheet and thereafter permitting it to solidify.

* * * * *